US007080100B2

(12) United States Patent  
Yokota

(10) Patent No.: US 7,080,100 B2
(45) Date of Patent: Jul. 18, 2006

(54) INSTALL PROCESSING APPARATUS, PROCESSING METHOD, STORAGE MEDIUM, AND PROGRAM

(75) Inventor: Yasuhiro Yokota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 10/391,753

(22) Filed: Mar. 20, 2003

(65) Prior Publication Data

US 2003/0217065 A1  Nov. 20, 2003

(30) Foreign Application Priority Data

Mar. 25, 2002 (JP) ............... 2002-083645
Feb. 4, 2003 (JP) ............... 2003-027610

(51) Int. Cl.
*G06F 17/30* (2006.01)

(52) U.S. Cl. .......... 707/104.1; 707/10; 707/101; 707/102; 707/103; 707/203; 709/221

(58) Field of Classification Search .......... 707/104.1, 707/10, 101, 102, 103, 203; 709/221; 717/174; 710/8; 713/200

See application file for complete search history.

(56) References Cited

U.S. PATENT DOCUMENTS 5,748,980 A * 5/1998 Lipe et al. .................. 710/8
6,363,402 B1   3/2002 Matsuura .................. 707/203
6,813,765 B1 * 11/2004 Flores ...................... 717/174
6,959,330 B1 * 10/2005 McIlroy .................... 709/221
2002/0107873 A1 * 8/2002 Winkler et al. .......... 707/104.1
2003/0084321 A1 * 5/2003 Tarquini et al. ............ 713/200

FOREIGN PATENT DOCUMENTS

JP  11-134178  5/1999
JP  11-175322  7/1999

OTHER PUBLICATIONS

Java 2 Platform, Micro Edition, "Connected Device Configuration (CDC) and the CVM Virtual Machine", Java.sun.com, Feb. 2002, pp. 1-3.*

* cited by examiner

*Primary Examiner*—Thuy N. Pardo
(74) *Attorney, Agent, or Firm*—Fitzpatrick, Cella, Harper & Scinto

(57) ABSTRACT

An object of this invention is to prevent installation of an unnecessary application into an embedded device. To achieve this object, a control program according to this invention includes a module (208) which stores system information of an embedded device (101), a module (205) which loads an application (201), an module (206) which determines on the basis of a loaded execution module (203) and the system information whether the application (201) normally operates, a module (209) which determines on the basis of a property (202) and the system information whether the application (201) normally operates, and a module (210) which outputs an error when the application is determined not to operate normally.

23 Claims, 13 Drawing Sheets

FIG. 3

```
# Hardware Profile
RAM =256MB
HDD = 100KB
Thread = 3
Network = TCP / IP
```

PROPERTY INFORMATION OF APPLICATION

FIG. 4

```
# LIBRARY
Library = com. canon. lib1, com. canon.lib2, com. canon.lib3

# SYSTEM RESOURCES OF DEVICE
Max RAM = 16MB
Max HDD = 256MB
Max Flash Memory = 64MB
Max Thread = 64
Network = TCP / IP, PPP

# REMAINING SYSTEM RESOURCES
RAM = 2MB
HDD = 128MB
Flash Memory = 48MB
Thread = 3
```

SYSTEM INFORMATION

FIG. 5

ERROR1 : LIBRARY IS NOT SUPPORTED.
ERROR2 : APPLICATION CAN OPERATE IF ANOTHER APPLICATION IN PROGRESS ENDS.
ERROR3 : APPLICATION CAN OPERATE IF RAM IS ADDED.
ERROR4 : APPLICATION CAN OPERATE IF HDD IS SUPPORTED.
ERROR5 : APPLICATION CAN OPERATE IF NETWORK CONNECTION FUNCTION IS SUPPORTED.

EXAMPLE OF ERROR INFORMATION

FIG. 13

| DIRECTORY INFORMATION |
|---|
| PROGRAM CODES CORRESPONDING TO FIRST CONTROL PROGRAM |
| PROGRAM CODES CORRESPONDING TO SECOND CONTROL PROGRAM |
| ⋮ |

INSTALL PROCESSING APPARATUS, PROCESSING METHOD, STORAGE MEDIUM, AND PROGRAM

FIELD OF THE INVENTION

The present invention relates to a processing technique used to dynamically install an application into an embedded device.

BACKGROUND OF THE INVENTION

Of various digital devices ranging from office equipment such as a copying machine and facsimile device to a portable terminal and interactive television, Non-PC devices except a so-called personal computer are generally called embedded devices.

Conventionally, an application in such an embedded device is statically linked to compilation and installed in the system when the system is constructed. It is often impossible to dynamically install an application during the operation of the embedded device. However, as many embedded devices are equipped with an Internet connection function, an application is installed into an embedded device from a Web browser in a PC (Personal computer) or WS (Work Station), or an embedded device itself downloads a necessary application from the Internet or a file server in a company and executes the application.

For example, a Java applet or Java application described in a Java language which is a trademark or registered trademark of Sun Microsystems, Inc. in the United States and other countries is dynamically downloaded into an embedded device equipped with a Java virtual machine (to be referred to as a JVM hereinafter) serving as a Java execution environment, and executed in the embedded device.

In conventional installation of an application into a device, whether an application to be installed copes with the OS (Operating System) of an embedded device is checked, and if the application is not proper, installation of the application can be inhibited, as disclosed in "Japanese Patent Laid-Open No. 11-175322". As disclosed in "Japanese Patent Laid-Open No. 11-134178", version information in a module is checked in installation, and installation of an unnecessary application can be inhibited.

A method of checking installation is also specified for installation of a Java applet and Java application. For example, in Java 2 Platform, Micro Edition (J2ME) which is also a registered trademark of Sun Microsystems, Inc., a profile "Mobile Information Device Profile (JSR-37) Specification (MIDP)" targeting mobile devices is developed by Java Community Process (JCP) Expert Group. In this specification, information on a Java application to be installed is described as MIDlet Attributes. At this time, the Java application version, profile version, JVM version, module size, and the like are described. These contents are compared with the Java execution environment of a device in installation, preventing installation of an unnecessary application.

In the prior art, even if the OS or version is proper, the operation of an installed application is not always guaranteed depending on a device support situation such as a hardware resource including a memory capacity or storage device capacity, or a network connection function. This problem is serious particularly in an embedded device. This is because the hardware resource is minimized for low cost, and another application may fail due to a shortage of the memory capacity or storage device capacity. If tasks exceed the limit value of tasks usable in the system, the original function of the embedded device may fail, and in the worst case the system may fail. Installation of an application which does not run wastefully consumes the resource of an external storage device.

The same problem also occurs when a Java application or Java applet is installed into an embedded device having a Java execution environment. Information of the above-mentioned MIDlet Attributes does not describe information on how many threads the Java application requires, which storage device such as a hard disk or flash memory is used, how much of the memory capacity is necessary, or which protocol is necessary for network connection. For this reason, whether a Java application or Java applet normally operates cannot be known until it is actually installed and executed. The profile of MIDlet Attributes does not describe the type of Java class library necessary for a Java application. Even if a Java application requires a Java class library created by the user or a Java class library unique to the device, whether the Java application normally operates cannot be known until it is actually installed and executed.

SUMMARY OF THE INVENTION

The present invention has been made to overcome the conventional drawbacks, and has as its object to prevent installation and execution of an unnecessary application by determining in advance whether the application normally operates in an embedded device when installing the application into the embedded device.

To achieve the above object, an install processing method according to the present invention has the following steps.

That is, an install processing method of installing an application containing an execution module and proper information into an embedded device comprises a loading step of loading the application, an execution module analysis step of analyzing a content of the execution module of the loaded application and determining on the basis of an execution module analysis result and system information of the embedded device whether the application normally operates in the embedded device, a property analysis step of analyzing the property information of the loaded application and determining on the basis of an analysis result and the system information whether the application normally operates in the embedded device, and an error notification step of outputting an error when the application is determined in the execution module analysis step or the property analysis step not to operate normally.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of property information contained in an application;

FIG. 4 is a view showing an example of system information of an embedded device;

FIG. 5 is a view showing an example of error information;

FIG. 13 is a view showing the memory map of a storage medium which stores the program codes of various control programs which can be read out by the CPU.

DETAILED DESCRIPTION OF THE PREFERRED EMBODIMENTS

Preferred embodiments of the present invention will now be described in detail in accordance with the accompanying drawings.

First Embodiment

The first embodiment of the present invention will be described below with reference to FIGS. 1 to 6.

Figure 1:
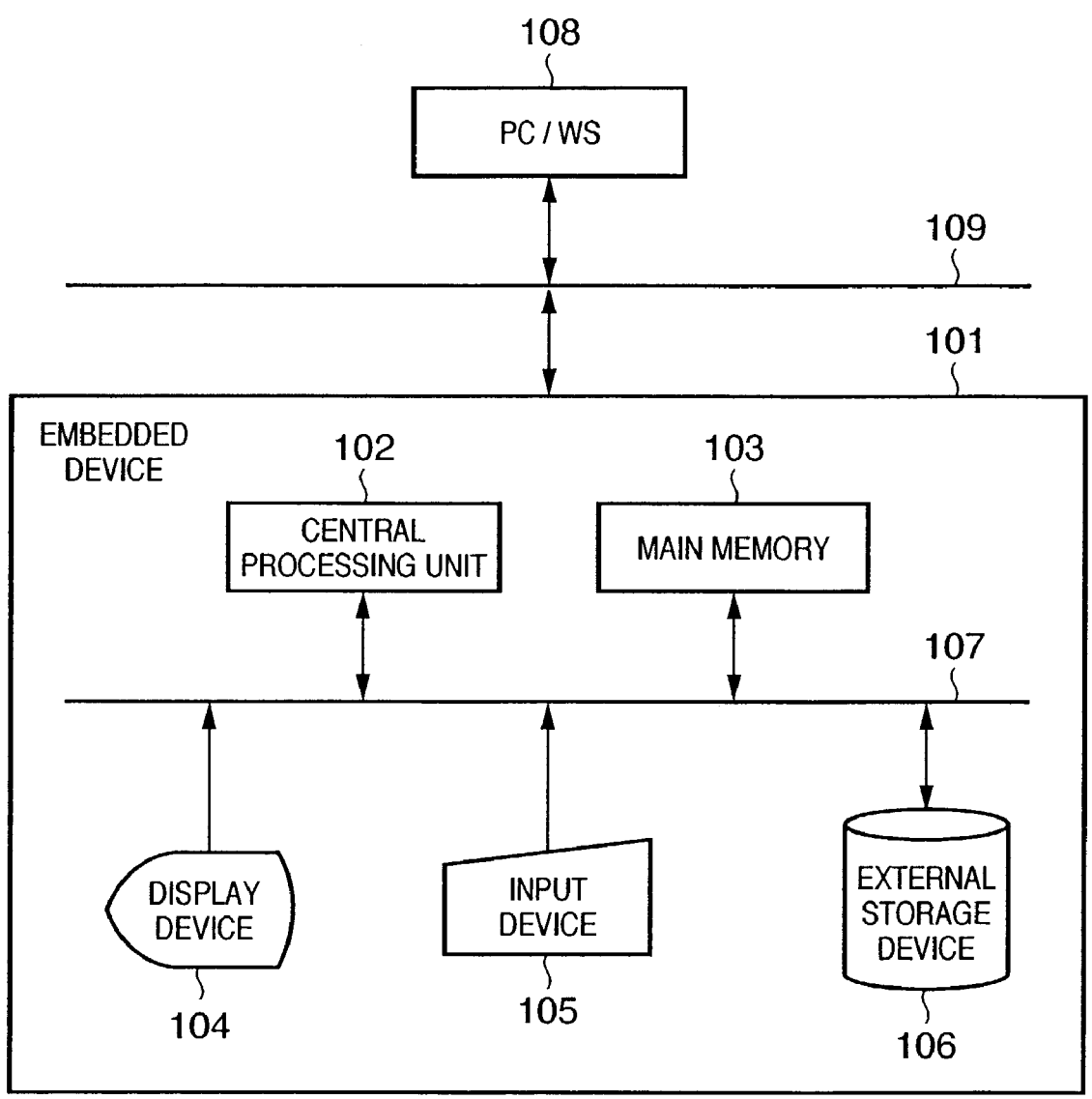
FIG. 1 is a block diagram showing a configuration of a system which realizes an install processing apparatus according to each embodiment of the present invention.

FIG. 1 is a block diagram showing a configuration of a system which realizes an install processing apparatus according to each embodiment of the present invention. In FIG. 1, reference numeral 101 denotes an embedded device. A general hardware arrangement of the embedded device will be explained.

Reference numeral 102 denotes a central processing unit (CPU) including a microprocessor which executes various processes to be described later.

Reference numeral 103 denotes a main memory including a RAM. The main memory 103 is used to store and execute an OS (Operating System) or program loaded from an external storage device 106.

Reference numeral 104 denotes a display device such as a CRT display or liquid crystal display which is used to display the state of a program in progress.

Reference numeral 105 denotes an input device such as a keyboard or pointing device.

The external storage device 106 is incorporated in the embedded device 101, and comprises a storage medium such as a hard disk, magneto optical disk, or flash memory. The external storage device 106 is used to store an OS (Operating System) and various application programs.

Reference numeral 107 denotes a bus used to exchange data and signals between the building components in the embedded device 101.

Reference numeral 108 denotes a PC or WS which is connected to the embedded device 101, as needed, and can transfer an application stored in the PC or WS.

Reference numeral 109 denotes a network used to transfer an application between the embedded device 101 and the PC or WS 108.

In the following embodiments including the first embodiment, a control program (to be referred to as an install processing program hereinafter) having the program codes of respective steps of an install processing method according to the present invention is executed by the central processing unit 102, realizing the install processing method. The present invention is not limited to this, and the install processing method may be realized by install processing-dedicated hardware. The dedicated hardware may be mounted in the embedded device or separated from the embedded device.

In the embedded device 101 having the above hardware arrangement, the install processing program starts upon reception of an application install processing instruction from the network PC or WS 108. This program is executed to load a transferred application into the main memory 103. The central processing unit 102 determines whether the application can be installed, and if installation is possible, stores the application in the external storage device 106. The result of determining whether the application can be installed is sent back to the PC or WS 108, and the PC or WS 108 issues a subsequent install processing instruction. In this case, it is also possible to display the progress of install processing on the display device 104 of the embedded device 101, and input data necessary for installation via the input device 105.

Figure 2:
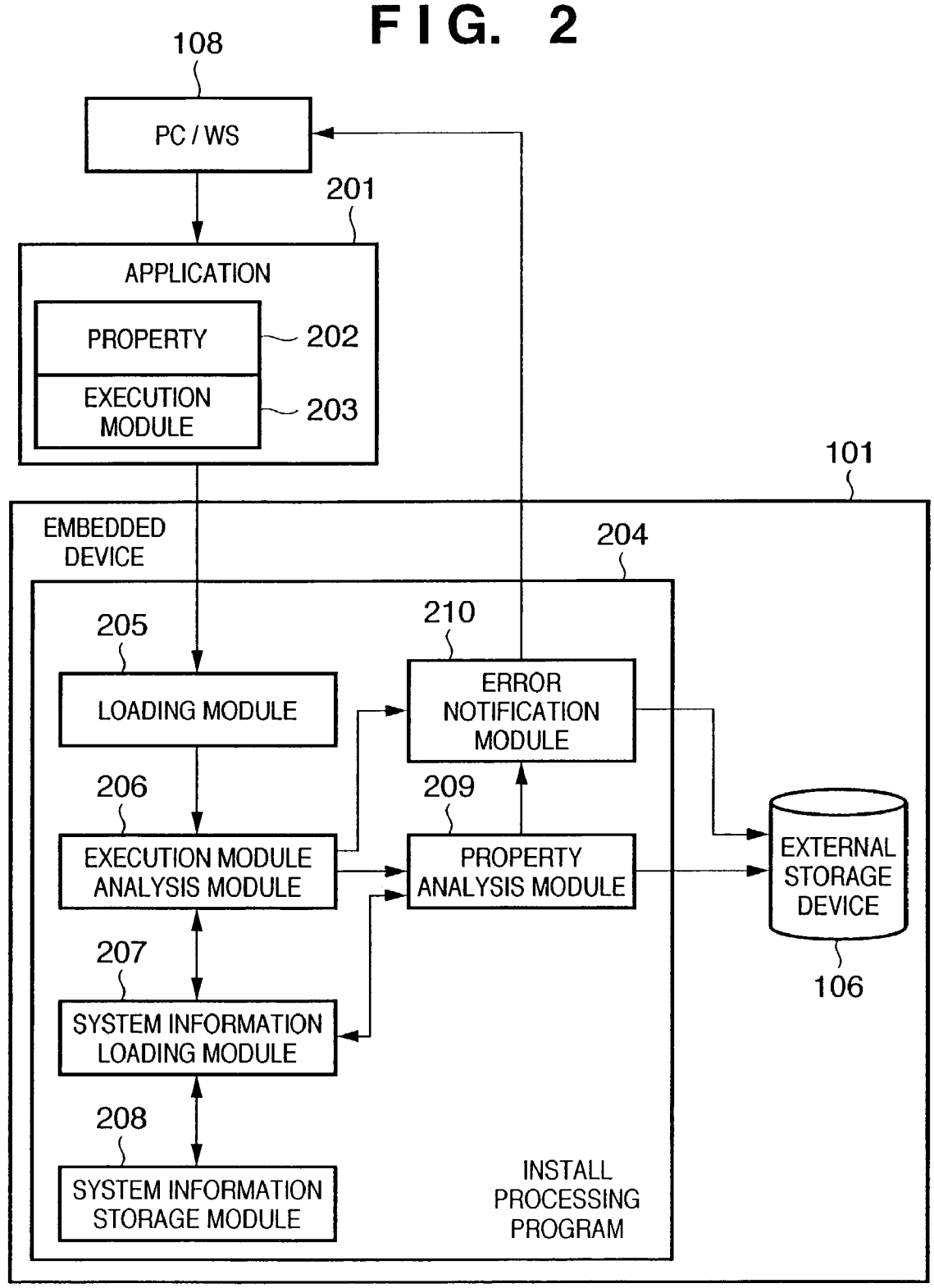
FIG. 2 is a block diagram for explaining an install processing function.

FIG. 2 is a block diagram showing an install processing function. In FIG. 2, reference numeral 201 denotes an application whose installation is designated by the PC or WS 108. The application 201 contains a property 202 and execution module 203.

The property 202 contains information on system resources necessary to execute the application 201.

The execution module 203 contains actual codes of the application 201.

Reference numeral 204 denotes a module arrangement of the install processing program according to the first embodiment of the present invention. The module arrangement 204 contains various modules 205 to 210 to be described below.

The loading module 205 loads the application 201 transferred from the PC or WS 108.

The execution module analysis module 206 analyzes the contents of the execution module 203 of the loaded application 201, and analyzes a list of libraries necessary to execute the application 201. At the same time, the execution module analysis module 206 acquires a list of libraries installed in the embedded device 101 by using the system information loading module 207 to be described below, and compares the lists. If a necessary library is not installed in the embedded device 101, the execution module analysis module 206 notifies the error notification module 210 to be described later of the result.

The system information loading module 207 loads, from the system information storage module 208 to be described below, a list of libraries installed in the embedded device 101, and information on system resources such as the capacity of the main memory and the number of executable tasks.

The system information storage module 208 stores a list of libraries installed in the embedded device 101, and information on system resources such as the capacity of the main memory and the number of executable tasks.

The property analysis module 209 analyzes the contents of the property 202 of the loaded application 201, and analyzes system resources necessary to execute the application 201. At the same time, the property analysis module 209 acquires a list of system resources of the embedded device 101 by using the system information loading module 207, and compares the system resources. If the embedded device 101 does not have a necessary system resource, the property analysis module 209 notifies the error notification module 210 to be described below of the result. When the execution module analysis module 206 and property analysis module 209 determine that the application can be installed (application normally operates in the embedded device 101), the application 201 is stored in the external storage device 106 of the embedded device 101.

When the execution module analysis module 206 and property analysis module 209 determine that installation is not proper (application does not normally operate in the embedded device 101), the error notification module 210 sends back the cause of improper installation to the PC or WS 108. If the PC or WS 108 designates to install the application, the application 201 is stored in the external storage device 106 of the embedded device 101.

FIG. 3 is a view showing an example of the property 202 contained in the application 201. In this example, the property 202 represents that system resources necessary to execute the application 201 are a main memory (RAM) of 256 KB, an external storage device (HDD) of 100 KB, three threads (Thread), and TCP/IP supported as a network (Network) function.

FIG. 4 is a view showing an example of system information of the embedded device 101. In this example, the system information represents that the embedded device 101 supports three libraries (Library) "com.canon.lib1", "com.canon.lib2", and "com.canon.lib3". The system information also represents that the system resources of the embedded device 101 are a maximum main memory (Max RAM) of 16 MB, a maximum external storage device (Max HDD) of 256 MB, a flash memory (Max Flash Memory) of 64 MB, 64 threads (Max Thread), and TCP/IP and PPP supported as network (Network) functions.

Further, the system information represents that system resources usable at the current time are a main memory (RAM) of 2 MB, an external storage device (HDD) of 128 MB, a flash memory (Flash Memory) of 48 MB, and three threads (Thread). A list of libraries obtained by analyzing the execution module 203 of the application 201, and system resources obtained by analyzing the property 202 of the application 201 are compared with the system information in FIG. 4, determining whether an application to be installed normally operates in the embedded device 101. Note that system information is momently changed to the latest state by the OS.

FIG. 5 is a view showing an example of an error type when the execution module analysis module 206 and property analysis module 209 determine whether an application can be properly installed into the embedded device 101 and that installation is not proper. In this example, ERROR 1 represents that a library necessary to execute an application is not supported. ERROR 2 represents that an application can operate if another application in progress ends. ERROR 3 represents that an application can operate if a main memory (RAM) is added. ERROR 4 represents that an application can operate if an external storage device (HDD) is supported. ERROR 5 represents that an application can operate if a network connection function is supported.

Figure 6:
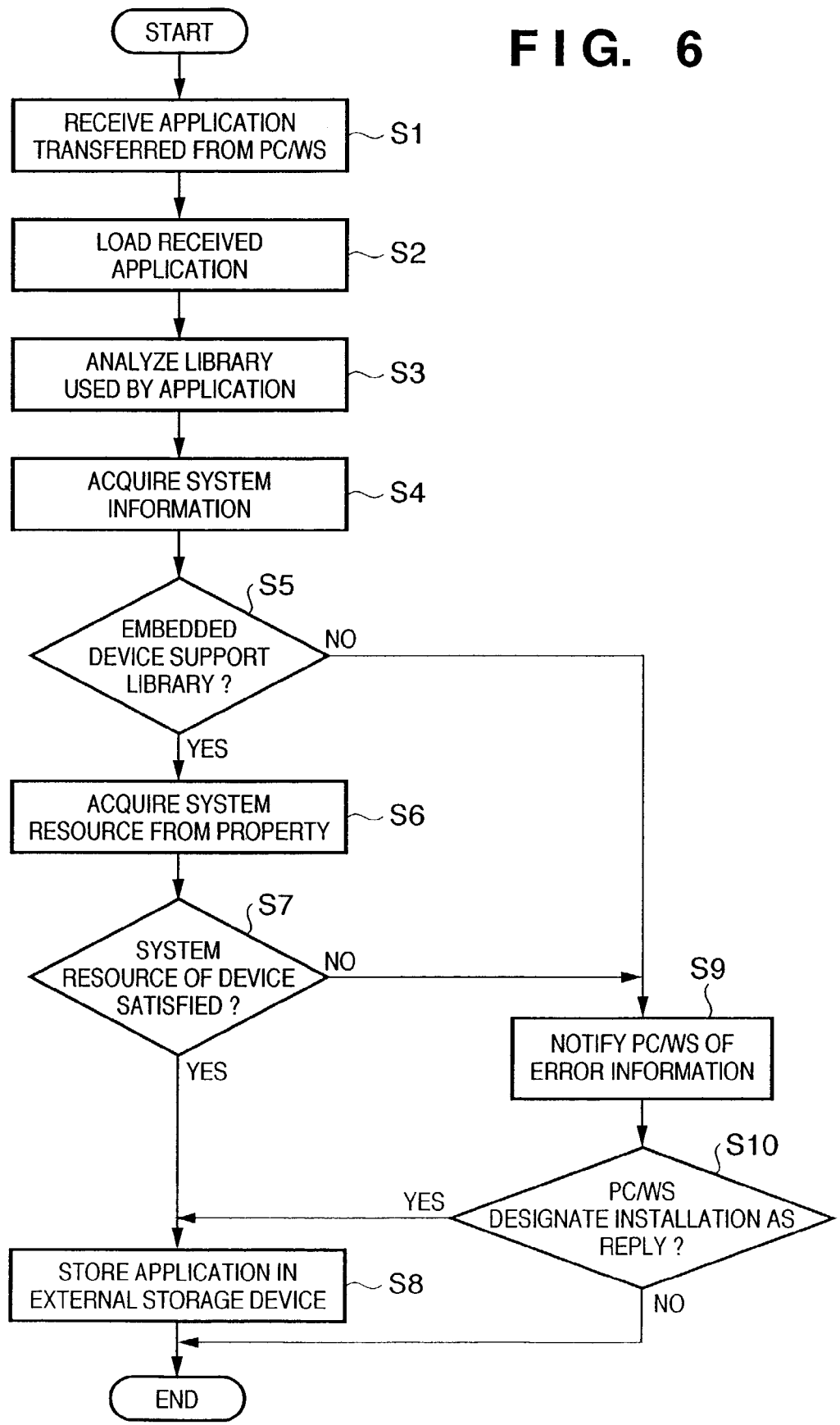
FIG. 6 is a flow chart showing an example of the control sequence of an install processing program according to the first embodiment of the present invention.

FIG. 6 is a flow chart showing the control processing sequence of the install processing program according to the first embodiment. The program codes of the processing program are stored in the main memory 103. The central processing unit 102 executes these program codes, and then the loading module 205, execution module analysis module 206, system information loading module 207, system information storage module 208, property analysis module 209, and error notification module 210 function.

The program codes correspond to the control sequence of the install processing method according to the first embodiment in which an application transferred from a network PC or WS is received in order to install the application, the execution module and property information of the received application and system information of an embedded device are compared with each other and determined, and if the embedded device satisfies application execution conditions, the application is stored in the external storage device of the embedded device.

As shown in FIG. 6, if the install processing program according to the first embodiment is executed, the embedded device receives an application transferred from the network PC or WS (step S1). The received application is loaded into the main memory 103 by the loading module 205 (step S2). The execution module analysis module 206 analyzes the contents of the execution module 203 of the loaded application 201, and analyzes a list of libraries necessary to execute the application 201 (step S3).

A list of libraries of the embedded device 101 that is held by the system information storage module 208 is acquired by the system information loading module 207 (step S4). The list of libraries necessary for the application that has been analyzed in step S3, and the list of libraries in system information that has been acquired in step S4 are compared (step S5). If the embedded device 101 is determined in step S5 to support the libraries, the property analysis module 209 analyzes the contents of the property 202 contained in the application 201 (step S6). The system resources of the embedded device 101 that are held by the system information storage module 208 are acquired by the system information loading module 207. The system resources are compared with system resources necessary for the application 201 that have been analyzed in step S6, determining whether the embedded device 101 satisfies system resources necessary for normal operation (step S7). If YES in step S7, the application is stored in the external storage device 106 of the embedded device 101 (step S8).

If NO in step S5 or S7, the error notification module 210 sends back information on the cause of improper installation to the network PC or WS which tries to install the application (step S9). If the PC or WS designates to install the application as a reply in accordance with the situation such as ERROR 2 in FIG. 5 (step S10), the flow advances to step S8 to perform processing of storing the application in the external storage device 106. If the PC or WS designates to cancel installation as a reply in step S10, install processing ends.

As described above, when an application is transferred from a network PC or WS to an embedded device in order to install the application, the install processing program according to the first embodiment is executed in the embedded device. The embedded device receives the transferred application, and compares the execution module and property information of the received application and system information of the embedded device, determining whether the embedded device satisfies application execution conditions. If the embedded device satisfies the execution conditions, the application can be stored in the external storage device. This can minimize the possibility of system down caused by forced execution of an impossible application.

Wasteful consumption of the resource of the external storage device by installation of an impossible application can be prevented.

Unconditional installation of an impossible application is prevented. In addition, the user is notified of the cause of an installation failure, and the user is provided with a choice of installing an application in accordance with the cause. If execution conditions are met by adding a system resource after installation, the application can be activated, improving the expandability and versatility of the embedded device.

Second Embodiment

The first embodiment has described processing of the install processing program when an application is installed from a network PC or WS. A function executable by the install processing program of the present invention is not limited to this. The second embodiment concerns a function of downloading an application from a network such as the Internet or an intranet and installing the application in response to an operation to the embedded device.

The second embodiment of the present invention will be described with reference to FIGS. 7 and 8.

Figure 7:
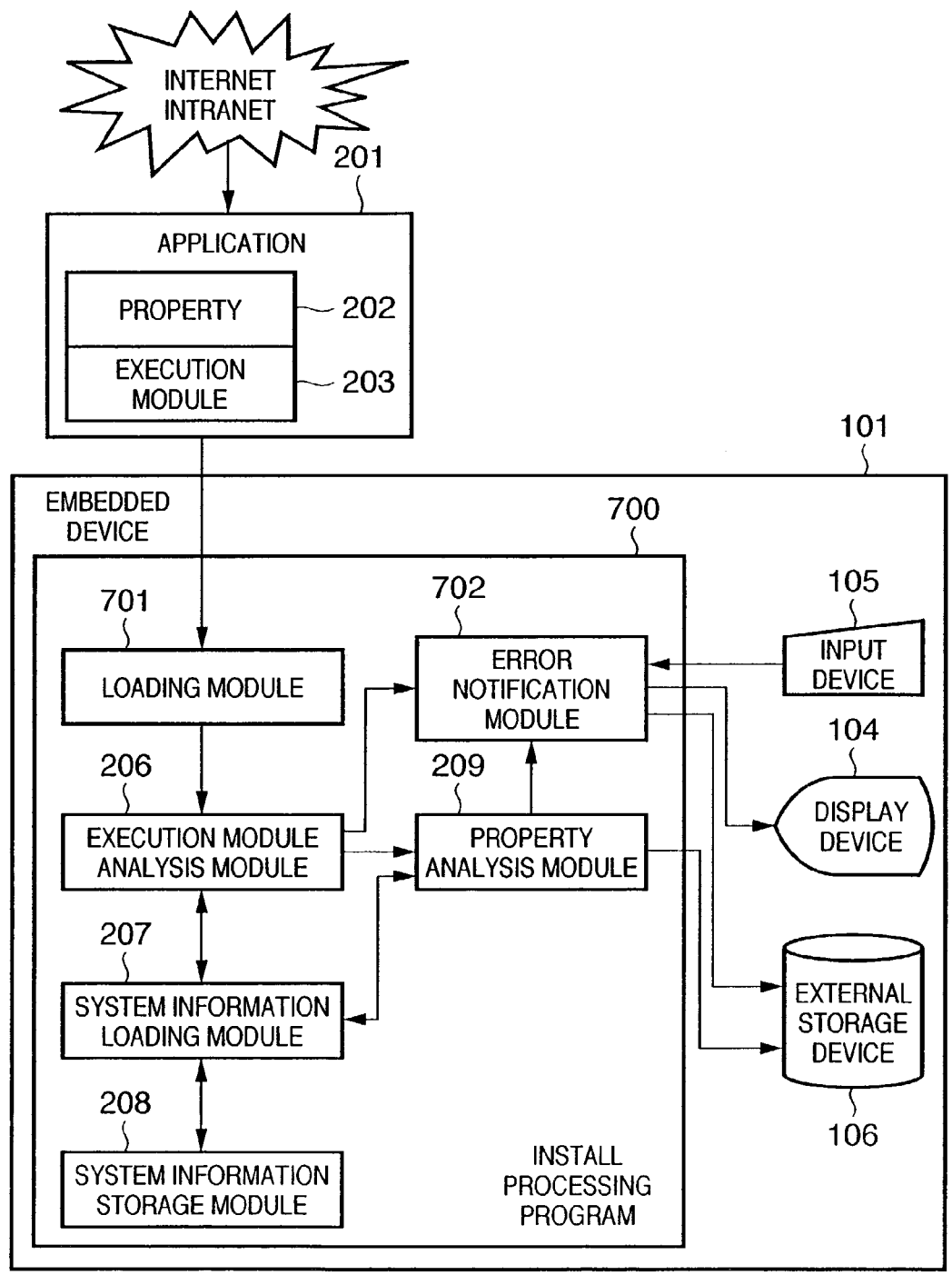
FIG. 7 is a block diagram for explaining the second install processing function according to the present invention.

FIG. 7 is a block diagram showing an install processing function. In FIG. 7, reference numeral 201 denotes an application downloaded from a network. The application 201 contains a property 202 and execution module 203.

The property 202 contains information on system resources necessary to execute the application 201.

The execution module 203 contains actual codes of the application 201.

Reference numeral 700 denotes a module arrangement of the install processing program according to the second embodiment of the present invention. The module arrangement 700 contains various modules 206 to 209, 701, and 702 to be described below.

The loading module 701 loads the application 201 downloaded from the network.

The execution module analysis module 206 analyzes the contents of the execution module 203 of the loaded application 201, and analyzes a list of libraries necessary to execute the application 201. At the same time, the execution module analysis module 206 acquires a list of libraries installed in an embedded device 101 by using the system information loading module 207 to be described below, and compares the lists. If a necessary library is not installed in the embedded device 101, the execution module analysis module 206 notifies the error notification module 702 to be described later of the result.

The system information loading module 207 loads, from the system information storage module 208 to be described below, a list of libraries installed in the embedded device 101, and information on system resources such as the capacity of the main memory and the number of executable tasks.

The system information storage module 208 stores a list of libraries installed in the embedded device 101, and information on system resources such as the capacity of the main memory and the number of executable tasks.

The property analysis module 209 analyzes the contents of the property 202 of the loaded application 201, and analyzes system resources necessary to execute the application 201. At the same time, the property analysis module 209 acquires a list of system resources of the embedded device 101 by using the system information loading module 207, and compares the system resources. If the embedded device 101 does not have a necessary system resource, the property analysis module 209 notifies the error notification module 702 to be described below of the result. When the execution module analysis module 206 and property analysis module 209 determine that the application can be installed (application normally operates in the embedded device), the application 201 is stored in an external storage device 106 of the embedded device 101.

When the execution module analysis module 206 and property analysis module 209 determine that installation is not proper, the error notification module 702 displays the cause of improper installation on a display device 104 and prompts the user to input subsequent processing. If the user designates via an input device 105 to install the application, the application 201 is stored in the external storage device 106 of the embedded device 101.

Figure 8:
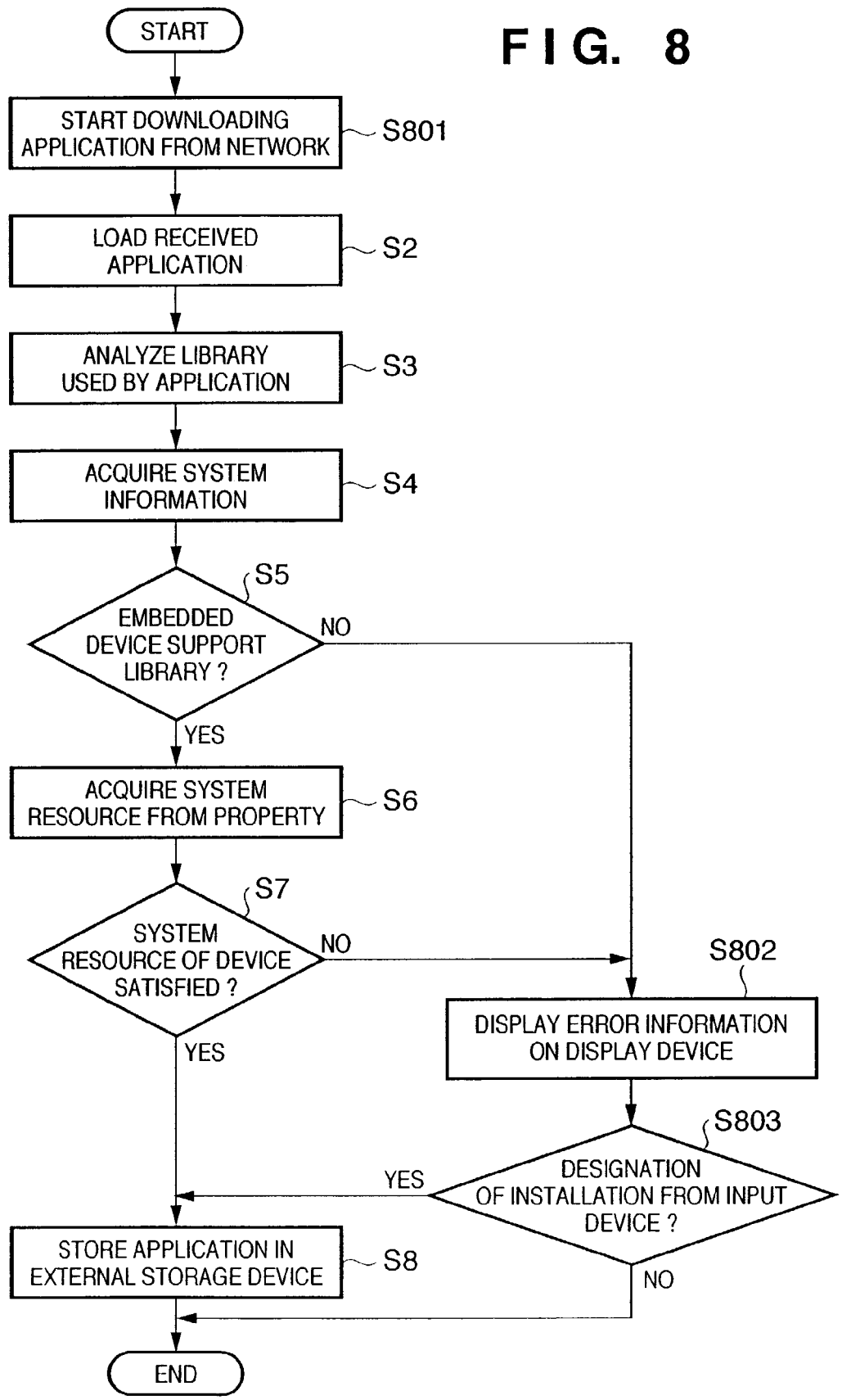
FIG. 8 is a flow chart showing an example of the control sequence of an install processing program according to the second embodiment of the present invention.

FIG. 8 is a flow chart showing the control processing sequence of the install processing program according to the second embodiment. The program codes of the processing program are stored in a main memory 103. A central processing unit 102 executes these program codes, and then the loading module 701, execution module analysis module 206, system information loading module 207, system information storage module 208, property analysis module 209, and error notification module 702 function.

The program codes correspond to the control sequence of the install processing method according to the second embodiment in which an application is downloaded from a network in order to install the application, the execution module and property information of the downloaded application and system information of an embedded device are compared with each other and determined, and if the embedded device satisfies application execution conditions, the application is stored in the external storage device of the embedded device.

In the second embodiment, if the embedded device shown in FIG. 8 executes the install processing program 700, the embedded device starts downloading an application from the network (step S801). The downloaded application is loaded into the main memory 103 by the loading module 700 (step S2).

The execution module analysis module 206 analyzes the contents of the execution module 203 of the loaded application 201, and analyzes a list of libraries necessary to execute the application 201 (step S3).

Library information of the embedded device 101 held by the system information storage module 208 is acquired by the system information loading module 207 (step S4). The list of libraries necessary for the application that has been analyzed in step S3, and the list of libraries in system information that has been acquired in step S4 are compared (step S5).

If the embedded device 101 is determined in step S5 to support the libraries, the property analysis module 209 analyzes the contents of the property 202 contained in the application 201 (step S6). The system resources of the embedded device 101 that are held by the system information storage module 208 are acquired by the system information loading module 207. The system resources are compared with system resources necessary for the application 201 that have been analyzed in step S6, determining whether the embedded device 101 satisfies system resources necessary for normal operation (step S7). If YES in step S7, the application is stored in the external storage device 106 of the embedded device 101 (step S8).

If NO in step S5 or S7, the error notification module 702 displays the cause of improper installation on the display device 104 and prompts the user to input subsequent processing (step S802). If the user designates via the input device 105 to install the application in accordance with the situation such as ERROR 2 in FIG. 5 (step S803), the flow advances to step S8 to perform processing of storing the application in the external storage device 106. If the user designates to cancel installation in step S803, install processing ends.

As described above, the install processing program according to the second embodiment is executed, and an application to be installed into an embedded device is downloaded from a network. The embedded device loads the downloaded application, and compares the execution module and property information of the loaded application and system information of the embedded device, determining whether the embedded device satisfies application execution conditions. Only when the embedded device satisfies the execution conditions the application can be stored in the external storage device. This can minimize the possibility of system down caused by forced execution of an impossible application.

Wasteful consumption of the resource of the external storage device by installation of an impossible application can be prevented.

Unconditional installation of an impossible application is prevented. In addition, the cause of an installation failure is displayed on the display device to the user, and the user is provided with a choice of installing an application in accordance with the cause. If execution conditions are met by adding a system resource after installation, the application can be activated, improving the expandability and versatility of the embedded device.

Third Embodiment

In the first and second embodiments, an application to be installed is comprised of one property and one execution module. An install processing program according to the third embodiment can be executed even for an application comprised of a plurality of properties and a plurality of execution modules, achieving the object of the present invention.

The third embodiment of the present invention will be explained with reference to FIGS. 9 and 10.

Figure 9:
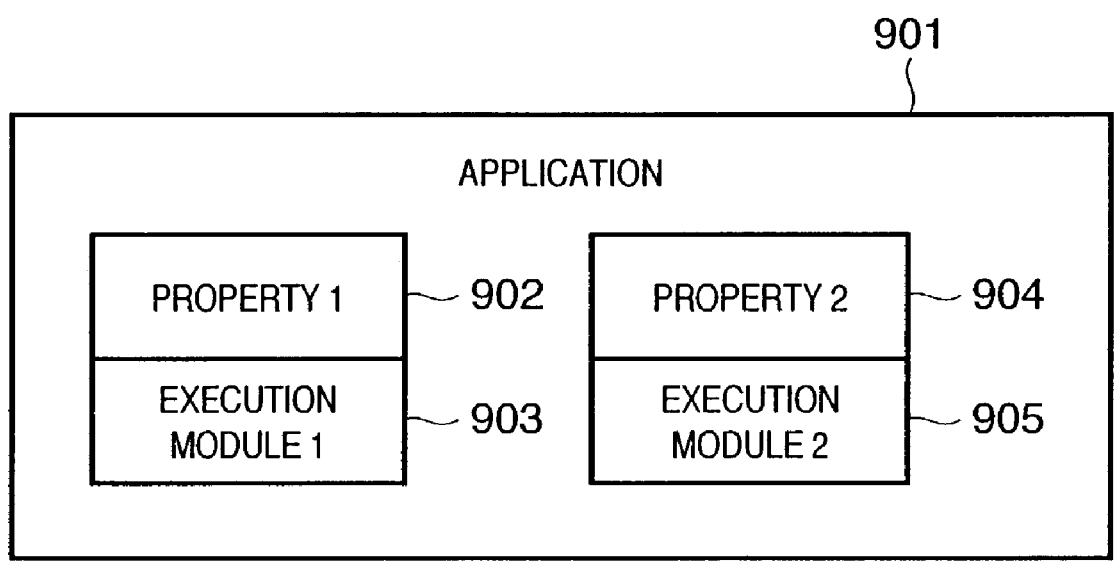
FIG. 9 is a view showing an example of an application to be installed by the install processing program according to the second embodiment of the present invention.

FIG. 9 shows an example of an application to be installed in the third embodiment. This application is comprised of a plurality of properties and a plurality of execution modules.

In FIG. 9, reference numeral 901 denotes an application comprised of a plurality of properties and a plurality of execution modules.

Reference numeral 902 denotes a first property which contains information on system resources necessary to execute a first execution module 903.

The first execution module 903 contains actual codes of the first execution module of the application 901.

Reference numeral 904 denotes a second property which contains information on system resources necessary to execute a second execution module 905.

The second execution module 905 contains actual codes of the second execution module of the application 901.

Figure 10:
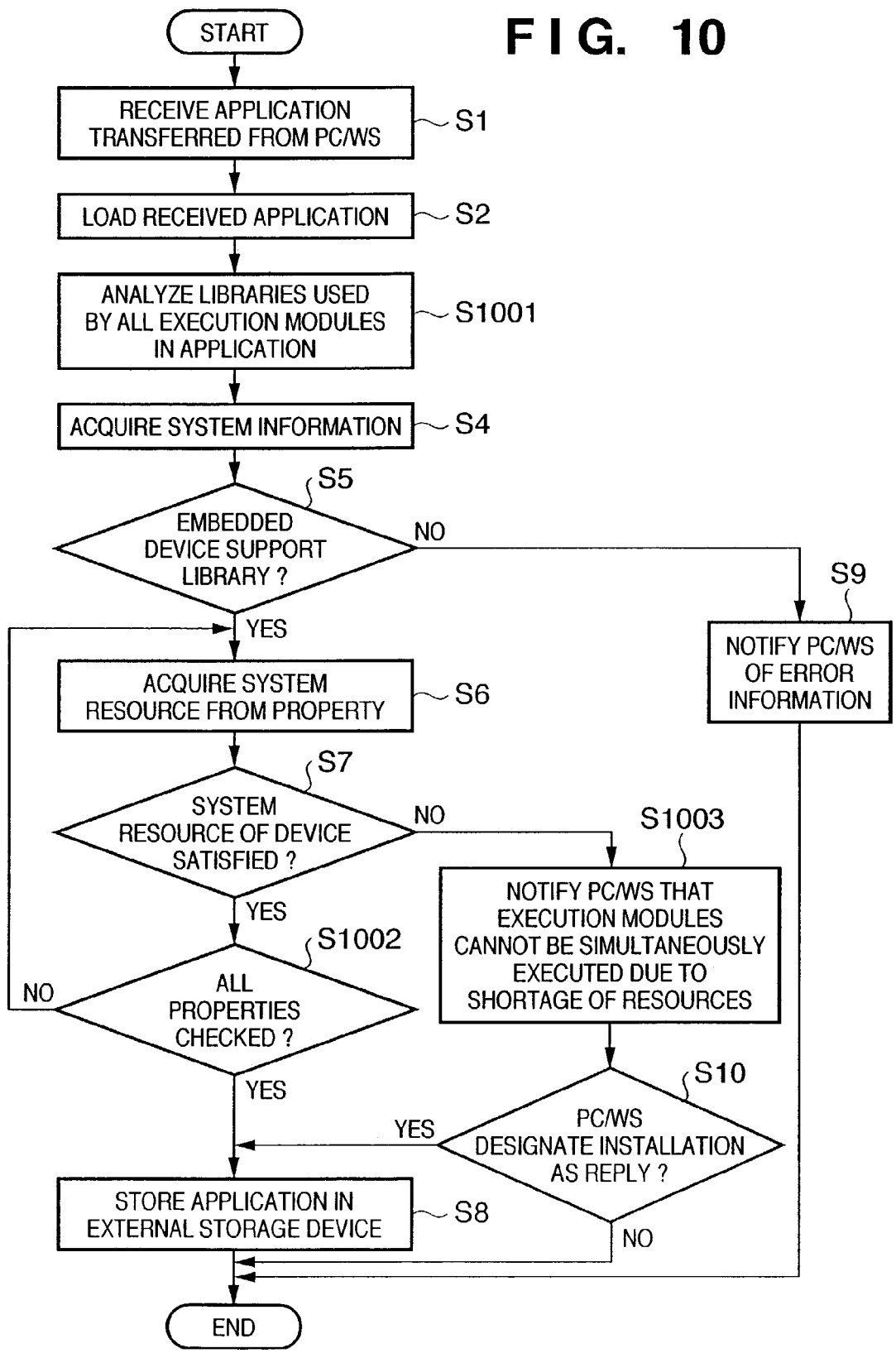
FIG. 10 is a flow chart showing an example of the control sequence of an install processing program according to the third embodiment of the present invention.

FIG. 10 is a flow chart showing the control processing sequence of the install processing program according to the third embodiment. The program codes of the processing program are stored in a main memory 103. A central processing unit 102 executes these program codes, and then a loading module 205, execution module analysis module 206, system information loading module 207, system information storage module 208, property analysis module 209, and error notification module 210 function.

The program codes correspond to the control sequence of the install processing method according to the third embodiment in which an application transferred from a network PC or WS is received in order to install the application, a plurality of execution modules of the received application and pieces of property information corresponding to the execution modules, and system information of an embedded device are compared with each other and determined, if the embedded device does not satisfy execution conditions, the PC or WS is notified that a plurality of execution modules cannot be simultaneously executed due to a shortage of resources, and if the PC or WS designates to install the application as a reply, the application is stored in the external storage device of the embedded device.

As shown in FIG. 10, if the install processing program according to the third embodiment is executed, the embedded device receives an application transferred from the network PC or WS (step S1). The received application is loaded into the main memory 103 by the loading module 205 (step S2). The execution module analysis module 206 analyzes the contents of the execution modules 903 and 905 of the loaded application 901, and analyzes a list of libraries necessary to execute the application 901 (step S1001).

A list of libraries of an embedded device 101 that is held by the system information storage module 208 is acquired by the system information loading module 207 (step S4). The list of libraries necessary for the application that has been analyzed in step S1001, and the list of libraries in system information that has been acquired in step S4 are compared (step S5). If the embedded device 101 is determined in step S5 not to support the libraries, the error notification module 210 sends back information on the cause of improper installation to the network PC or WS which tries to install the application (step S9), ending install processing.

If the embedded device 101 is determined in step S5 to support the libraries, the property analysis module 209 analyzes the contents of the first property 902 contained in the application 901 (step S6). The system resources of the embedded device 101 that are held by the system information storage module 208 are acquired by the system information loading module 207. The system resources are compared with system resources necessary for the first execution module 903 that have been analyzed in step S6, determining whether the embedded device 101 satisfies system resources necessary for normal operation (step S7). If YES in step S7, whether all the properties contained in the application 901 have been checked is determined (step S1002). If NO in step S1002, the next property is analyzed. If YES in step S1002, the application 901 is stored in the external storage device 106 of the embedded device 101 (step S8), ending install processing.

If NO in step S7, the error notification module 210 notifies the network PC or WS which tries to install the application that a plurality of execution modules cannot be simultaneously executed due to a shortage of resources (step S1003). If the PC or WS designates to install the application as a reply (step S10), the flow advances to step S8 to store the application in the external storage device 106. If the PC or WS designates to cancel installation as a reply in step S10, install processing ends.

As described above, when an application comprised of a plurality of properties and a plurality of execution modules is transferred from a network PC or WS to an embedded device in order to install the application, the install processing program according to the third embodiment is executed in the embedded device. The embedded device receives the transferred application, and compares a plurality of execution modules of the received application and pieces of property information corresponding to the execution module, and system information of the embedded device, determining whether the embedded device satisfies application execution conditions. If the embedded device is determined not to satisfy execution conditions, the PC or WS is notified that a plurality of execution modules cannot be simultaneously executed due to a shortage of resources. If the PC or WS designates to install the application as a reply, the application is stored in the external storage device of the embedded device. This can minimize the possibility of system down caused by forced execution of an impossible application.

Wasteful consumption of the resource of the external storage device by installation of an impossible application can be prevented.

Unconditional installation of an impossible application is prevented. In addition, the user is notified of a shortage of resources. If the user desires to install the application, the user is provided with a choice of executing installation. If execution conditions are met by adding a system resource after installation, the application can be activated, improving the expandability and versatility of the embedded device.

Fourth Embodiment

The fourth embodiment concerns processing of an install processing program when an embedded device is short of system resources for normally executing an application. More specifically, an install processing program according to the fourth embodiment is executed to store an application in a temporary storage area until the shortage of system resources is solved.

Figure 11:
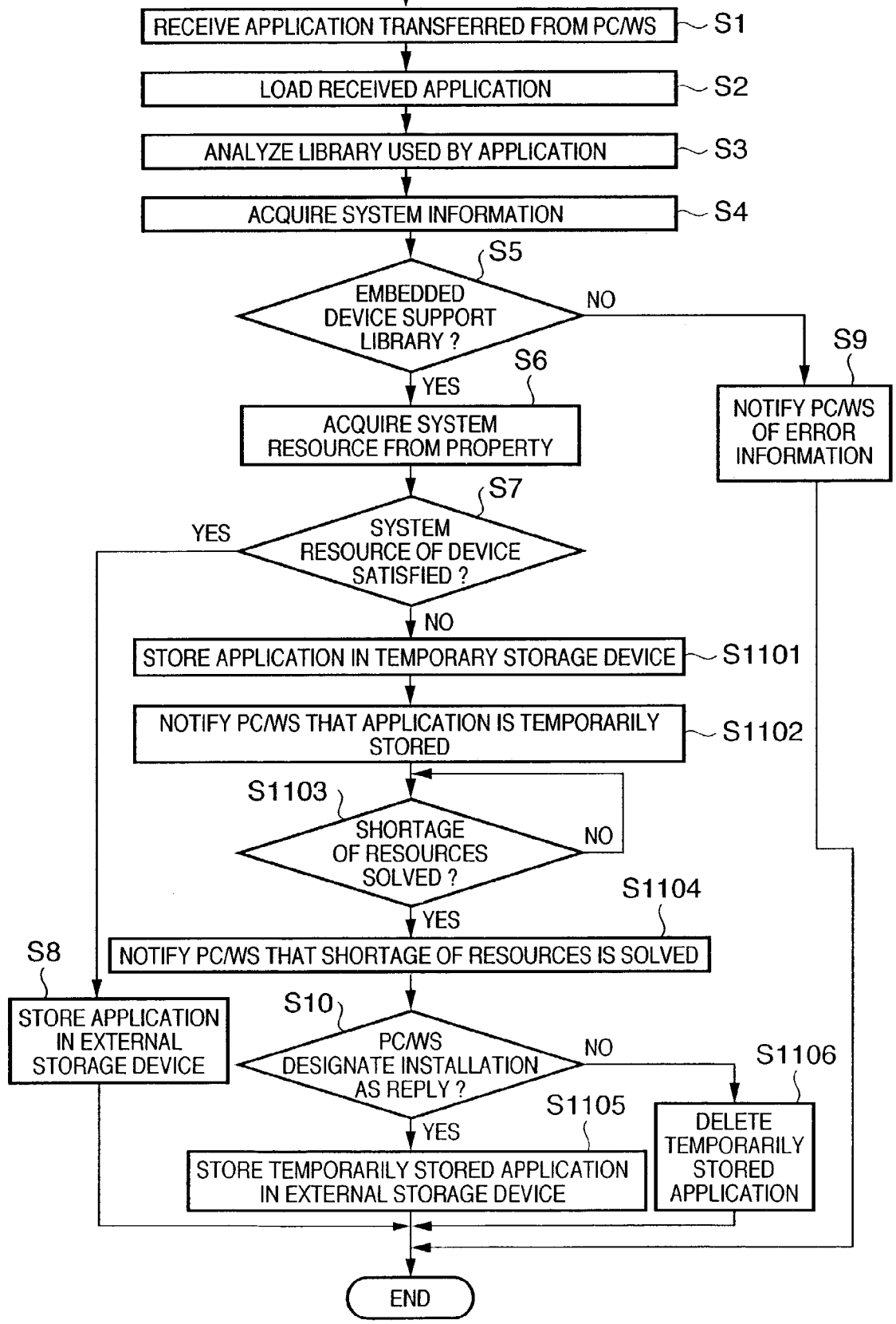
FIG. 11 is a flow chart showing an example of the control sequence of an install processing program according to the fourth embodiment of the present invention.

The fourth embodiment of the present invention will be described with reference to FIG. 11. FIG. 11 is a flow chart showing the control processing sequence of the install processing program according to the fourth embodiment. The program codes of the processing program are stored in a main memory 103. A central processing unit 102 executes these program codes, and then processing is done by a loading module 205, execution module analysis module 206, system information loading module 207, system information storage module 208, property analysis module 209, and error notification module 210.

The program codes correspond to the control sequence of the install processing method according to the fourth embodiment in which an application transferred from a network PC or WS is received in order to install the application, the execution module and property information of the received application and system information of an embedded device are compared with each other and determined, if the embedded device is short of system resources for normally executing the application, the application is stored in a temporary storage area until the shortage of system resources is solved, and after the shortage of system resources is solved, the application is stored in the external storage device of the embedded device.

As shown in FIG. 11, if the install processing program according to the fourth embodiment is executed, the embedded device receives an application transferred from the network PC or WS (step S1). The received application is loaded into the main memory 103 by the loading module 205 (step S2). The execution module analysis module 206 analyzes the contents of the execution module 203 of the loaded application 201, and analyzes a list of libraries necessary to execute the application 201 (step S3).

A list of libraries of an embedded device 101 that is held by the system information storage module 208 is acquired by the system information loading module 207 (step S4). The list of libraries necessary for the application that has been analyzed in step S3, and the list of libraries in system information that has been acquired in step S4 are compared (step S5). If the embedded device 101 is determined in step S5 to support the libraries, the property analysis module 209 analyzes the contents of the property 202 contained in the application 201 (step S6). The system resources of the embedded device 101 that are held by the system information storage module 208 are acquired by the system information loading module 207. The system resources are compared with system resources necessary for the application 201 that have been analyzed in step S6, determining whether the embedded device 101 satisfies system resources necessary for normal operation (step S7). If YES in step S7, the application is stored in an external storage device 106 of the embedded device 101 (step S8), ending install processing.

If NO in step S7, the application is stored in the temporary storage area of the main memory 103 or the temporary storage memory area of a hard disk (step S1101). The error notification module 210 notifies the network PC or WS which tries to install the application that the application is temporarily stored (step S1102). In this case, the temporarily stored application is not recognized as an executable application yet. Thereafter, whether the shortage of system resources is solved is monitored (step S1103). If YES in step S1103, the network PC or WS is notified that the shortage of system resources is solved (step S1104). The flow waits for a response representing whether to install the application (step S10). If execution of installation is sent back, the temporarily stored application is stored in the external storage device 106 (step S1105), ending install processing. If cancellation of installation is sent back, the temporarily stored application is deleted (step S1106), ending install processing.

If the embedded device 101 is determined in step S5 not to support the libraries, the error notification module 210 sends back information on the cause of improper installation to the network PC or WS which tries to install the application (step S9), ending install processing.

As described above, when an application is transferred from a network PC or WS to an embedded device in order to install the application, the install processing program according to the fourth embodiment is executed in the embedded device. The embedded device receives the transferred application, and compares the execution module and property information of the received application and system information of the embedded device, determining whether the embedded device satisfies application execution conditions. If the embedded device is short of system resources for normally executing the application, the application is stored in a temporary storage area until the shortage of system resources is solved. After the shortage of system resources is solved, the application can be stored in the external storage device of the embedded device. This can minimize the possibility of system down caused by forced execution of an impossible application.

When the embedded device is short of system resources, the application is stored in a temporary storage area until the shortage of system resources is solved. Install processing of the application from the PC or WS need not be repeated after the shortage of system resources is solved.

Fifth Embodiment

The fifth embodiment concerns another processing of an install processing program when an embedded device is short of system resources for normally executing an application. More specifically, an install processing program according to the fifth embodiment is executed to store an application in the external storage device of the embedded device while inhibiting execution of the application until the shortage of system resources is solved. After the shortage of system resources is solved, the application is switched to an executable state.

Figure 12:
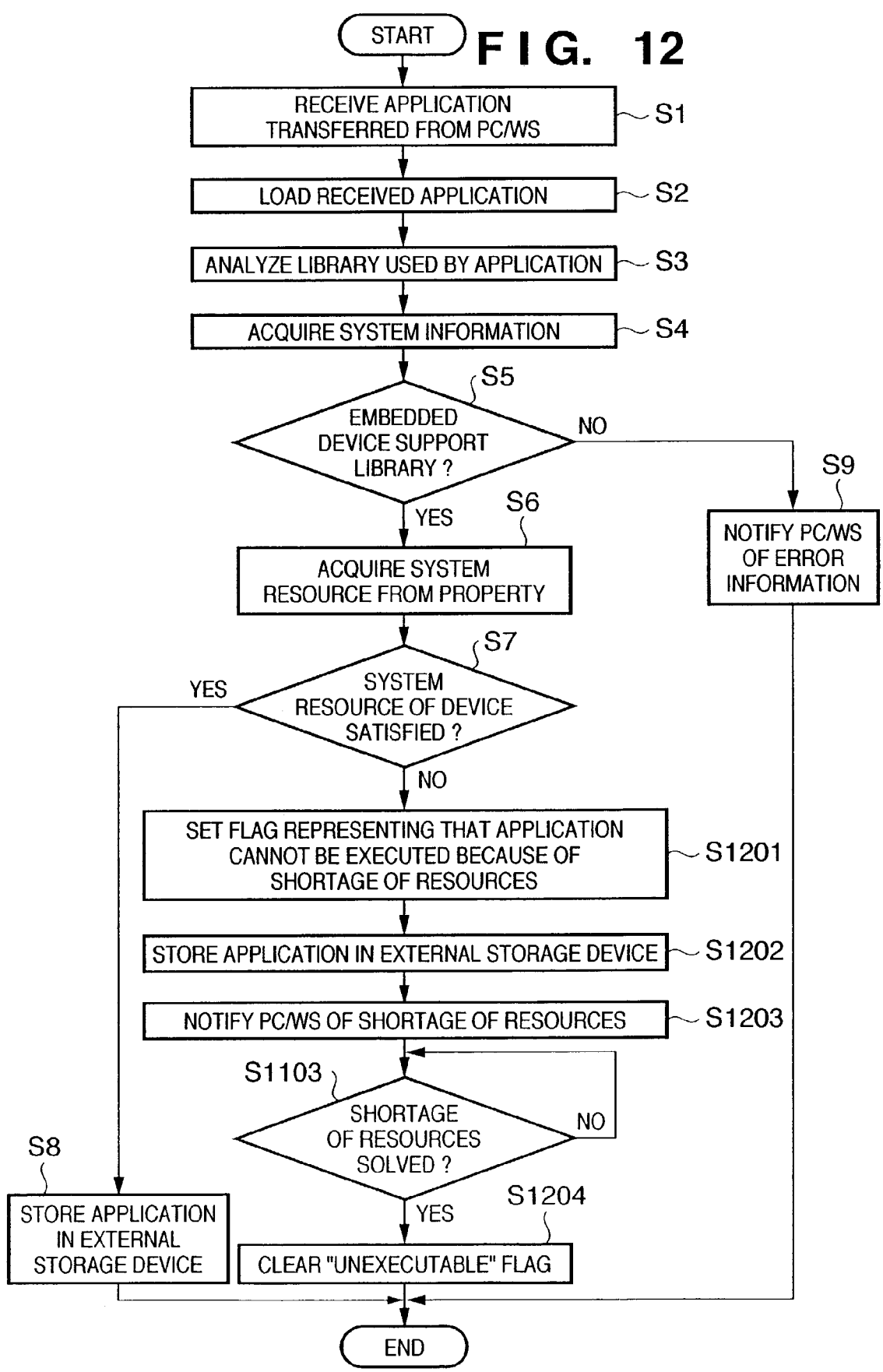
FIG. 12 is a flow chart showing an example of the control sequence of an install processing program according to the fifth embodiment of the present invention.

The fifth embodiment of the present invention will be described with reference to FIG. 12. FIG. 12 is a flow chart showing the control processing sequence of the install processing program according to the fifth embodiment. The program codes of the processing program are stored in a main memory 103. A central processing unit 102 executes these program codes, and then a loading module 205, execution module analysis module 206, system information loading module 207, system information storage module 208, property analysis module 209, and error notification module 210 function.

The program codes correspond to the control sequence of the install processing method according to the fifth embodiment in which an application transferred from a network PC or WS is received in order to install the application, the execution module and property information of the received application and system information of an embedded device are compared with each other and determined, if the embedded device is determined to be short of system resources for normally executing the application, the application is stored in the external storage device of the embedded device while inhibiting execution of the application until the shortage of system resources is solved, and after the shortage of system resources is solved, the application can be executed.

As shown in FIG. 12, if the install processing program according to the fifth embodiment is executed, the embedded device receives an application transferred from the network PC or WS (step S1). The received application is loaded into the main memory 103 by the loading module 205 (step S2). The execution module analysis module 206 analyzes the contents of the execution module 203 of the loaded application 201, and analyzes a list of libraries necessary to execute the application 201 (step S3).

A list of libraries of an embedded device 101 that is held by the system information storage module 208 is acquired by the system information loading module 207 (step S4). The list of libraries necessary for the application that has been analyzed in step S3, and the list of libraries in system information that has been acquired in step S4 are compared (step S5). If the embedded device 101 is determined in step S5 to support the libraries, the property analysis module 209 analyzes the contents of the property 202 contained in the application 201 (step S6). The system resources of the embedded device 101 that are held by the system information storage module 208 are acquired by the system information loading module 207. The system resources are compared with system resources necessary for the application 201 that have been analyzed in step S6, determining whether the embedded device 101 satisfies system resources necessary for normal operation (step S7). If YES in step S7, the application is stored in an external storage device 106 of the embedded device 101 (step S8), ending install processing.

If the embedded device is determined in step S7 not to have sufficient system resources owing to a shortage of the memory, a flag representing that the application cannot be executed due to the shortage of system resources is set (step S1201). The application is stored in the external storage device 106 of the embedded device 101 (step S1202). The error notification module 210 notifies the network PC or WS which tries to install the application that the application cannot be executed owing to the shortage of system resources (step S1203). In this case, the application having the flag set such that the application cannot be executed is not recognized as an executable application. For example, in a system which activates an application by double-clicking an icon, the icon is not displayed or is displayed in a double-click disable state. In a system which activates an application by selecting a menu, menu items are not displayed or are displayed in a selection disable state.

After that, whether the shortage of system resources is solved is monitored (step S1103). If YES in step S1103, the flag representing that the application cannot be executed due to the shortage of system resources is cleared (step S1204), ending install processing. The shortage of system resources is solved when, for example, the system resources are released at the end of another application in progress or a physical memory is added. When the "unexecutable" flag is cleared, the system which activates an application by double-clicking an item displays an icon which has not been displayed, or changes an icon displayed in a double-click disable state to a double-click enable state. The system which activates an application by selecting a menu displays menu items which have not been displayed, or changes menu items displayed in a selection disable state to a selection enable state.

If the embedded device 101 is determined in step S5 not to support the libraries, the error notification module 210 sends back information on the cause of improper installation to the network PC or WS which tries to install the application (step S9), ending install processing.

As described above, when an application is transferred from a network PC or WS to an embedded device in order to install the application, the install processing program according to the fifth embodiment is executed in the embedded device. The embedded device receives the transferred application, and compares the execution module and property information of the received application and system information of the embedded device, determining whether the embedded device satisfies application execution conditions. If the embedded device is short of system resources for normally executing the application, the application is stored in the external storage device of the embedded device while execution of the application is inhibited until the shortage of system resources is solved. After the shortage of system resources is solved, the application is switched to an executable state. This can minimize the possibility of system down caused by forced execution of an impossible application.

When the embedded device is short of system resources, the application is stored in the external storage device of the embedded device in advance. The application can be executed only by adding an insufficient system resource, obviating the need for repetitive install processing of the application from the PC or WS.

Other Embodiment

In the above embodiments, the program codes shown in FIGS. 6, 8, 10, 11, and 12 are stored in the main memory 103. Alternatively, the program codes shown in FIGS. 6, 8, 10, 11, and 12 may be stored in the storage medium of the external storage device 106 or an internal storage resource, read out from the storage medium, and executed by the central processing unit (CPU) 102.

FIG. 13 is a view showing the memory map of a storage medium which stores the program codes of various control programs which can be read out by the CPU. For example, program codes shown in the flow chart of FIG. 6, i.e., program codes in the first embodiment are stored in the storage medium as program codes corresponding to the first control program. In addition, program codes in the second embodiment are stored as program codes corresponding to the second control program.

Although not shown, this storage medium may store information for managing stored programs, such as version information and the author name. The storage medium may also store information dependent on, e.g., an OS on the program reading side, such as an icon for displaying a program so as to identify it.

Data belonging to various programs are also managed in directories. When a program for installing various programs into a computer and a program to be installed are compressed, a decompression program or the like may be stored.

The functions of the program codes shown in FIGS. 6, 8, 10, 11, and 12 may be achieved by the system in accordance with an externally installed program. In this case, information containing a program can be supplied to the system from a storage medium such as a CD-ROM, flash memory, or FD, or from an external storage medium via a network.

The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the novel functions of the present invention, and the storage medium which stores the program codes constitutes the present invention.

The medium for supplying the program codes includes a floppy® disk, hard disk, optical disk, magneto optical disk, DVD, CD-ROM, CD-R, magnetic tape, nonvolatile memory card, ROM, and EEPROM.

The functions of the above-described embodiments are realized when the computer executes the readout program codes. Also, the functions of the above-described embodiments are realized when an operating system or the like running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

The present invention may be applied to a system including a plurality of devices or an apparatus including a single device. The effects of the present invention can be obtained when a program described by software for achieving the present invention is downloaded by the system or apparatus from a network database in accordance with a communication program.

As has been described above, the present invention can prevent installation and execution of an unnecessary application by determining in advance whether the application normally operates in an embedded device when installing the application into the embedded device. As many apparently widely different embodiments of the present invention can be made without departing from the spirit and scope thereof, it is to be understood that the invention is not limited to the specific embodiments thereof except as defined in the claims.

The present invention is not limited to the above embodiments and various changes and modifications can be made within the spirit and scope of the present invention. Therefore to apprise the public of the scope of the present invention, the following claims are made.

What is claimed is:

1. An install processing method of installing an application containing property information into an embedded device, comprising:
    a loading step of loading the application;
    a property analysis step of analyzing the property information of the loaded application and determining on the basis of a property information analysis result and system information of the embedded device whether the application normally operates in the embedded device; and
    an error notification step of outputting an error when the application is determined in the property analysis step not to operate normally, wherein when property information of the application including a plurality of execution modules is loaded in the loading step, and the application is determined in the property analysis step not to normally operate because a plurality of execution modules cannot be simultaneously normally operated even if each execution module can normally operate, a determination result is output in the error notification step.

2. The method according to claim 1, further comprising an execution module analysis step of analyzing a content of an execution module of the loaded application and determining on the basis of an execution module analysis result and the system information of the embedded device whether the application normally operates in the embedded device,
    wherein, the property analysis step analyzes a list of libraries necessary to execute the application on the basis of the content of the execution module, reads out a list of libraries in the embedded device from the system information, and determines whether the application normally operates, on the basis of whether the libraries necessary for the application are stored in the embedded device.

3. The method according to claim 1, wherein in the property analysis step, analyzing the property information, analyzing information on a system resource necessary to execute the application, reading out information on a system resource of the embedded device from the system information, and determining whether the application normally operates, on the basis of whether the embedded device has the system resource necessary for the application.

4. The method according to claim 3, wherein the information on the system resource includes information on at least anyone of a RAM capacity, a hard disk capacity, and a network connection function of the embedded device.

5. The method according to claim 3, wherein when the embedded device is determined in the property analysis step not to have the system resource necessary for the application, the application is installed into the embedded device, and the application cannot be executed until a shortage of the system resource is solved.

6. The method according to claim 1, wherein the error notification step further comprises a step of providing a cause of determining in the property analysis step that the application does not normally operate.

7. The method according to claim 1, wherein when the application is determined in the property analysis step to normally operate, the application is installed into the embedded device.

8. A storage medium for storing a control program for causing a computer to realize an install processing method defined in claim 1.

9. A control program to be used by a computer to realize an install processing method defined in claim 1.

10. An install processing method of installing an application containing property information into an embedded device, comprising:
a loading step of loading the application;
a property analysis step of analyzing the property information of the loaded application and determining on the basis of a property information analysis result and system information of the embedded device whether the application normally operates in the embedded device; and
an error notification step of outputting an error when the application is determined in the property analysis step not to operate normally,
wherein the property analysis step acquires information on a system resource necessary to execute the application from the property information, reads out information on a system resource of the embedded device from the system information, and determines whether the application normally operates, on the basis of whether the embedded device has the system resource necessary for the application,
and wherein when the embedded device is determined in the property analysis step not to have the system resource necessary for the application, the application is stored in a temporary storage of the embedded device, and when a shortage of the system resource is determined in the property analysis step to be solved, a determination result is output in the error notification step.

11. The method according to claim 10, further comprising an execution module analysis step of analyzing a content of an execution module of the loaded application and determining on the basis of an execution module analysis result and the system information of the embedded device whether the application normally operates in the embedded device,
wherein the execution module analysis step analyzes a list of libraries necessary to execute the application on the basis of the content of the execution module, reads out a list of libraries in the embedded device from the system information, and determines whether the application normally operates, on the basis of whether the libraries necessary for the application are stored in the embedded device.

12. The method according to claim 10, wherein when the application is determined in the property analysis step to normally operate, the application is installed into the embedded device.

13. The method according to claim 10, wherein when the embedded device is determined in the property analysis step not to have the system resource necessary for the application, the application is installed into the embedded device, and the application cannot be executed until a shortage of the system resource is solved.

14. An install processing apparatus which installs an application containing property information into an embedded device, comprising:
loading means for loading the application;
analysis means for analyzing the property information of the loaded application and determining on the basis of a property information analysis result and system information of the embedded device whether the application normally operates in the embedded device; and
error notification means for outputting an error when the application is determined by said analysis means not to operate normally,
wherein when property information of the application including a plurality of execution modules is loaded by said loading means, and the application is determined by said analysis means not to normally operate because a plurality of execution modules cannot be simultaneously normally operated even if each execution module can normally operate, a determination result is output by said error notification means.

15. The apparatus according to claim 14, wherein said analysis means analyzes a content of an execution module of the loaded application and determines on the basis of an execution module analysis result and the system information of the embedded device whether the application normally operates in the embedded device,
and wherein said analysis means analyzes a list of libraries necessary to execute the application on the basis of the content of the execution module, reads out a list of libraries in the embedded device from the system information, and determines whether the application normally operates, on the basis of whether the libraries necessary for the application are stored in the embedded device.

16. The apparatus according to claim 14, wherein said analysis means analyzes the property information, analyzes information on a system resource necessary to execute the application, reads out information on a system resource of the embedded device from the system information, and determines whether the application normally operates, on the basis of whether the embedded device has the system resource necessary for the application.

17. The apparatus according to claim 14, wherein when the application is determined by said analysis means to normally operate, the application is installed into the embedded device.

18. The apparatus according to claim 14, wherein when the embedded device is determined by said analysis means not to have the system resource necessary for the application, the application is installed into the embedded device, and the application cannot be executed until a shortage of the system resource is solved.

19. An install processing apparatus which installs an application containing property information into an embedded device, comprising:
loading means for loading the application;
analysis means for analyzing the property information of the loaded application and determining on the basis of an analysis result and system information of the embedded device whether the application normally operates in the embedded device; and error notification means for outputting an error when the application is determined by said analysis means not to operate normally, wherein said analysis means acquires information on a system resource necessary to execute the application from the property information, reads out information on a system resource of the embedded device from the system information, and determines whether the application normally operates, on the basis of whether the embedded device has the system resource necessary for the application, and wherein when the embedded device is determined by said analysis means not to have the system resource necessary for the application, the application is stored in a temporary storage of the embedded device, and when a shortage of the system resource is determined by said analysis means to be solved, a determination result is output by said error notification means.

20. The apparatus according to claim 19, wherein said analysis means analyzes a content of an execution module of the loaded application and determines on the basis of an execution module analysis result and the system information of the embedded device whether the application normally operates in the embedded device, and and wherein said analysis means analyzes a list of libraries necessary to execute the application on the basis of the content of the execution module, reads out a list of libraries in the embedded device from the system information, and determines whether the application normally operates, on the basis of whether the libraries necessary for the application are stored in the embedded device.

21. The apparatus according to claim 19, wherein said analysis means analyzes the property information, analyzes information on a system resource necessary to execute the application, reads out information on a system resource of the embedded device from the system information, and determines whether the application normally operates, on the basis of whether the embedded device has the system resource necessary for the application.

22. The apparatus according to claim 19, wherein when the application is determined by said analysis means to normally operate, the application is installed into the embedded device.

23. The apparatus according to claim 19, wherein when the embedded device is determined by said analysis means not to have the system resource necessary for the application, the application is installed into the embedded device, and the application cannot be executed until a shortage of the system resource is solved.

* * * * *

UNITED STATES PATENT AND TRADEMARK OFFICE
CERTIFICATE OF CORRECTION

| | |
|---|---|
| PATENT NO. | : 7,080,100 B2 |
| APPLICATION NO. | : 10/391753 |
| DATED | : July 18, 2006 |
| INVENTOR(S) | : Yasuhiro Yokota |

It is certified that error appears in the above-identified patent and that said Letters Patent is hereby corrected as shown below:

ON TITLE PAGE ITEM -56-
References Cited U.S. PATENT DOCUMENTS
"2002/0107873 A1* 8/2002 Winkler et al....707/104.1" should read
-- 2002/0207873 A1* 8/2002 Winkler et al....707/104.1--.

ON TITLE PAGE ITEM -57-
ABSTRACT, "an module" should read -- a module --.

COLUMN 4:
Line 20, "of-an" should read -- of an --.

COLUMN 16:
Line 32, "normally, wherein" should read -- normally, ¶ wherein --;
Lines 56-63 Claim 3 should read as follows:
-- The method according to claim 1, wherein the property analysis step further comprises:
    analyzing the property information;
    analyzing information on a system resource necessary to execute the application;
    reading out information on a system resource of the embedded device from the system information; and
    determining whether the application normally operates, on the basis of whether the embedded device has the system resource necessary for the application. --; and Line 66, "anyone" should read -- any one --.

UNITED STATES PATENT AND TRADEMARK OFFICE
CERTIFICATE OF CORRECTION

PATENT NO. : 7,080,100 B2
APPLICATION NO. : 10/391753
DATED : July 18, 2006
INVENTOR(S) : Yasuhiro Yokota It is certified that error appears in the above-identified patent and that said Letters Patent is hereby corrected as shown below:

<u>COLUMN 19</u>:
Line 25, "and" should be deleted.

Signed and Sealed this

First Day of May, 2007

JON W. DUDAS
*Director of the United States Patent and Trademark Office*